United States Patent
Sukegawa et al.

(10) Patent No.: US 7,130,299 B2
(45) Date of Patent: Oct. 31, 2006

(54) DIGITAL SUBSCRIBER LINE COMMUNICATION METHOD AND APPARATUS

(75) Inventors: Kiyoshi Sukegawa, Kawasaki (JP); Yasuhiro Ono, Kawasaki (JP); Tetsuya Tsuboi, Kawasaki (JP); Joutaro Koshikawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1051 days.

(21) Appl. No.: 10/100,486

(22) Filed: Mar. 18, 2002

(65) Prior Publication Data

US 2003/0081614 A1  May 1, 2003

(30) Foreign Application Priority Data

Oct. 31, 2001  (JP)  .............................. 2001-335414

(51) Int. Cl.
*H04L 12/66* (2006.01)

(52) U.S. Cl. .................... 370/352; 370/395.1; 370/466

(58) Field of Classification Search ..................... None
See application file for complete search history.

(56) References Cited

U.S. PATENT DOCUMENTS

| 6,667,971 B1 * | 12/2003 | Modarressi et al. | 370/352 |
| 6,891,825 B1 * | 5/2005 | O'Dell et al. | 370/352 |
| 2003/0118028 A1 * | 6/2003 | Neal et al. | 370/395.21 |

* cited by examiner

*Primary Examiner*—Chau T. Nguyen
*Assistant Examiner*—Jung Park
(74) *Attorney, Agent, or Firm*—Katten Muchin Rosenman LLP

(57) ABSTRACT

A DSL communication method and apparatus provides mutual communications between a user-site DSL modem and a provider-site router by using an existing two-wire telephone line and an existing DSL communication technology. In the DSL modem, a plurality of virtual channel values are correlated to a PPP connection between the modem and the router. Input IP data is received and the IP data is output according to a priority class defined for a sender IP data contained in the input IP data. An ATM cell is generated in which one of the plurality of virtual channel values corresponding to the sender IP data of the input IP data is assigned to the output IP data. The resulting ATM cell is transmitted from the modem to a DSL circuit connected to the router.

7 Claims, 22 Drawing Sheets

FIG.5

| GROUP 1 | SENDER IP ADDRESS | VC VALUE | SERVICE |
|---|---|---|---|
| | 192.168.0.2 | 32 | IPT |
| | 192.168.0.5 | 33 | WEB ACCESS |
| | 192.168.0.6 | 33 | WEB ACCESS |

FIG.12

| SENDER IP ADDR. | PRIORITY RANK | BAND | SERVISE |
|---|---|---|---|
| 192.168.0.2 | 1 | 64Kbps | IP TELEPHONE |
| 192.168.0.5 | 2 | BEST EFFORT | WEB ACCESS |

FIG.17

| VC VALUE | QOS | BAND | SERVICE |
|---|---|---|---|
| VC32 | CBR | 64Kbps | IP TELEPHONE |
| VC33 | UBR | — | WEB ACCESS |
| VC34 | CBR | 64Kbps | IP TELEPHONE |

FIG.21

| SENDER IP ADDR. | PPP GROUP No | VC VALUE | SERVICE |
|---|---|---|---|
| 192.168.0.2 | 1 | 32 | IP TELEPHONE |
| 192.168.0.5 | 1 | 33 | WEB ACCESS |
| 192.168.0.6 | 2 | 34 | IP TELEPHONE |
| 192.168.0.7 | 2 | 35 | WEB ACCESS |

DIGITAL SUBSCRIBER LINE COMMUNICATION METHOD AND APPARATUS

BACKGROUND OF THE INVENTION

1. Field of the Invention

The present invention relates to a DSL (Digital Subscriber Line) communication method and apparatus that provides communications between a user model and an ISP (Internet Service Provider) router for DSL services by using an existing two-wire telephone line and an existing DSL communication technology.

2. Description of the Related Art

In recent years, the expectation for ADSL (Asymmetric DSL) services is increasing by rapid growth of the Internet services.

FIG. 1 shows the configuration of an ADSL system that uses a conventional communication method. In this ADSL system, a personal computer 11 for Internet Web access and a personal computer 12 for IP telephone service are connected to an ADSL modem 14 over an LAN at the user premises. The ADSL modem 14 is connected to an office-side DSLAM (DSL Access Multiplexer) 16 via an ADSL circuit.

In the ADSL system of FIG. 1, the ADSL modem 14 processes the various communication protocols for Internet connection. The DSLAM 16 carries out the multiplexing and termination of the ADSL circuit. The DSLAM 16 is connected to an ATM switch 18. The ATM switch 18 is connected to an ISP (Internet Service Provider)-site router 20 that is provided as an ISP access server. In the example of FIG. 1, the router 20 is installed for a specific Internet service provider ISP1. Generally, the router of this type is installed for each of various Internet service providers. The router 20 performs the routing of IP data, the user authentication for Internet connection and the protocol conversion. The user-site ADSL modem 14 is connected to the Internet by means of the router 20.

With the conventional ADSL service, it does not have the function to deal with IP data for Web access and IP data for IP telephone separately. For this reason, when the user wishes to use the IP telephone during Web access on a single ADSL circuit, it is impossible to assign the required channel to use the IP telephone as the channel is already used by the IP data for Web access. Thus, the conventional ADSL communication has a problem that the transmission of the IP telephone voice may be delayed or the noise in the IP telephone voice may occur.

With the conventional ADSL service, when a single ISP supports both the IP data for IP telephone and the IP data for Web access, a PPP (Point-to-Point Protocol) connection is established between the user-site ADSL modem 14 and the ISP-site router 20. It is necessary that there is the one-to-one correspondence between the VP/VC (virtual path/virtual channel) value assigned and the PPP connection. Then the mutual communication between the modem 14 and the router 20 is carried out to transmit and receive the IP data for IP telephone and the IP data for Web access. In this case, there is no difference in the header information of the ATM cell between the IP data for IP telephone and the IP data for Web access.

Therefore, the modem 14 and the router 20 recognize only the same VC value of the ATM cell for both the IP data for IP telephone and the IP data for Web access. It is impossible to give priority to the transmission of the IP data for IP telephone during the communication of the IP data for Web access. Especially in the DSLAM 16 and the ATM switch 18 wherein only the processing of ATM cell level is performed, if the ATM cell has the same VC value, the same processing must be performed.

FIG. 2 shows the configuration of another ADSL system which uses a conventional communication method.

Conventionally, one conceivable method for raising the quality of the IP data for IP telephone using the existing communication technology is that the two VC1/VC2 leased line connection between the modem 14 and the router 20 be used rather than using the PPP connection, as shown in FIG. 2. However, it is necessary to assign a global IP to the user who uses the leased line connection shown in FIG. 2, and the communication cost needed for the user to receive the ADSL service becomes highly expensive.

SUMMARY OF THE INVENTION

An object of the present invention is to provide an improved DSL communication method and apparatus in which the above-described problems are eliminated.

Another object of the present invention is to provide a DSL communication method that can efficiently perform priority processing for a specific IP data, such as IP telephone data, and can prevent the increasing of communication cost due to the use of a leased line or the related equipment.

Another object of the present invention is to provide a DSL communication apparatus that can efficiently perform priority processing for a specific IP data, such as IP telephone data, and can prevent the increasing of communication cost due to the use of a leased line or the related equipment.

The above-mentioned objects of the present invention are achieved by a DSL communication method that provides mutual communications between a user-site DSL modem and a provider-site router by using an existing two-wire telephone line and an existing DSL communication technology, the method comprising the steps of: correlating a plurality of virtual channel values to a PPP connection between the modem and the router; receiving input IP data and outputting the IP data according to a priority class defined for a sender IP data contained in the input IP data; generating an ATM cell in which one of the plurality of virtual channel values corresponding to the sender IP data of the input IP data is assigned to the output IP data; and transmitting the resulting ATM cell to a DSL circuit connected to the router.

The above-mentioned objects of the present invention are achieved by a user-site digital subscriber line DSL modem that is connected to a provider-site router to provide mutual communications between the modem and the router by using an existing two-wire telephone line and an existing DSL communication technology, the DSL modem comprising: a VC management unit which correlates a plurality of virtual channel values to a PPP connection between the modem and the router; an IP data priority unit which receives input IP data and outputs the IP data according to a priority class defined for a sender IP data contained in the input IP data; and an ATM cell generating unit which generates an ATM cell in which one of the plurality of virtual channel values corresponding to the sender IP data of the input IP data is assigned to the output IP data, wherein the DSL modem transmits the resulting ATM cell to a DSL circuit connected to the router.

According to the DSL communication method and apparatus of the present invention, a plurality of virtual channel values are correlated to a PPP connection between the user-site DSL modem and the provider-site router, and the IP data of the IP telephone service can be preferentially processed over the IP data of the Web access service. It is possible for the present invention to efficiently perform the priority processing to speedily receive the IP telephone voice with good quality.

Furthermore, there is no necessity for a leased line connection when the DSL communication method and apparatus of the present invention is used to receive both the IP telephone service and the Web access service, and it is possible for the present invention to prevent the increasing of communication cost due to the use of the leased line.

BRIEF DESCRIPTION OF THE DRAWINGS

Other objects, features and advantages of the present invention will become apparent from the following detailed description when read in conjunction with the accompanying drawings.

FIG. 5 is a diagram for explaining a VC value management table used by the ADSL modem of the present embodiment.

FIG. 12 is a diagram for explaining an IP priority table used by the IP priority processing unit of the present embodiment.

FIG. 17 is a diagram for explaining a VC priority table used by the ADSL modem of the present embodiment.

FIG. 21 is a diagram for explaining a PPP group table used by the ADSL modem of the present embodiment.

DETAILED DESCRIPTION OF PREFERRED EMBODIMENTS

A description will now be given of preferred embodiments of the present invention with reference to the accompanying drawings.

Figure 1:
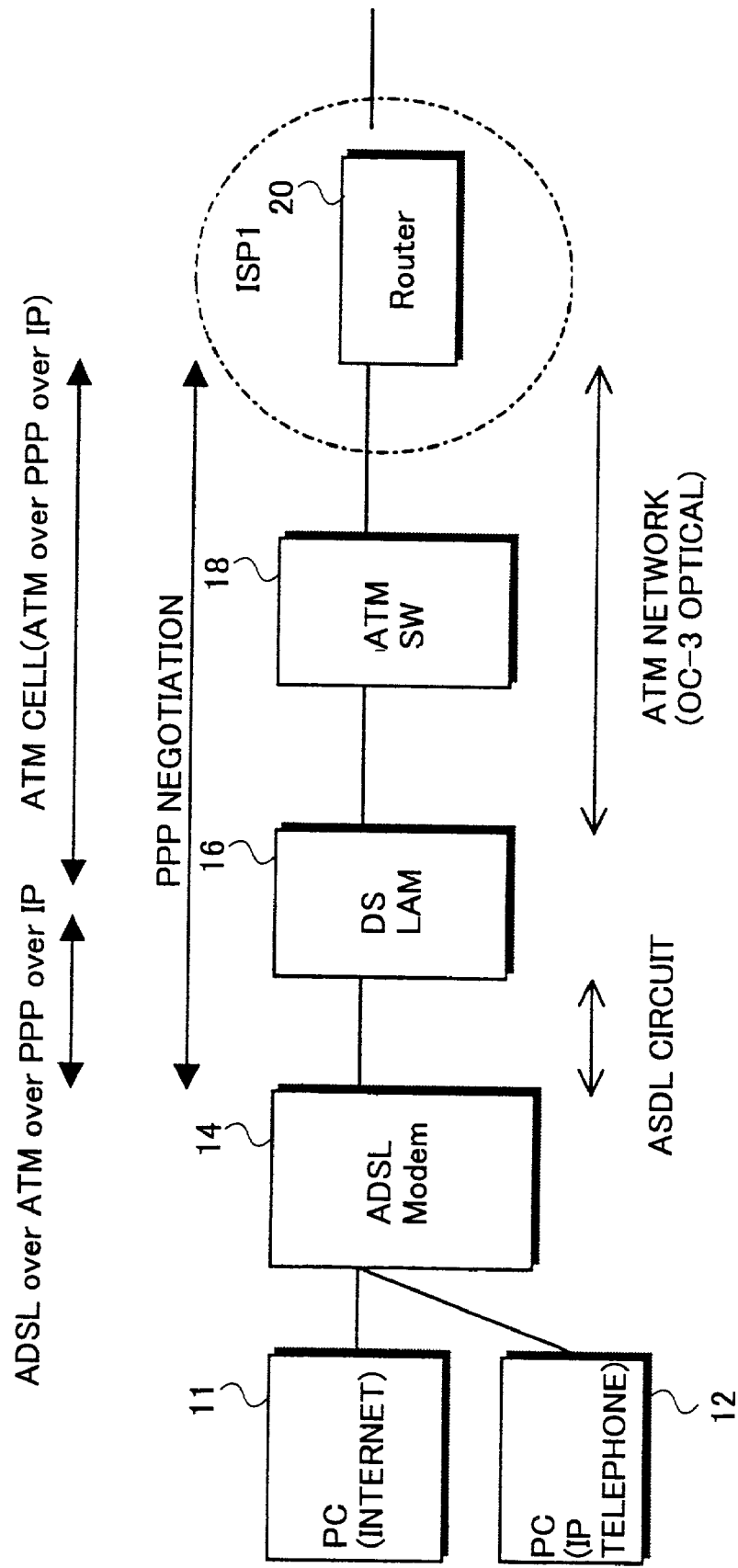
FIG. 1 is a block diagram showing the configuration of an ADSL system which uses a conventional method.
Figure 2:
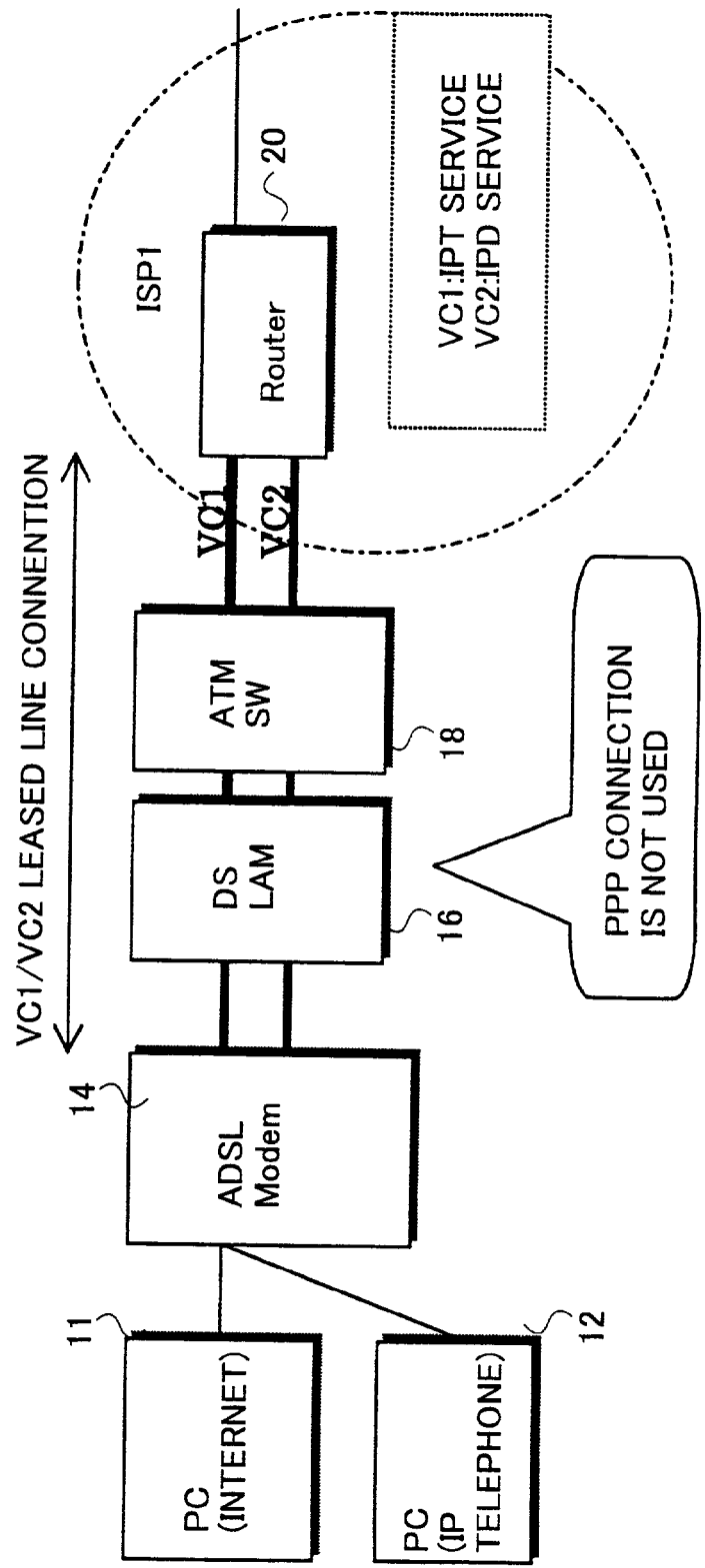
FIG. 2 is a block diagram showing the configuration of another ADSL system which uses a conventional method.
Figure 3:
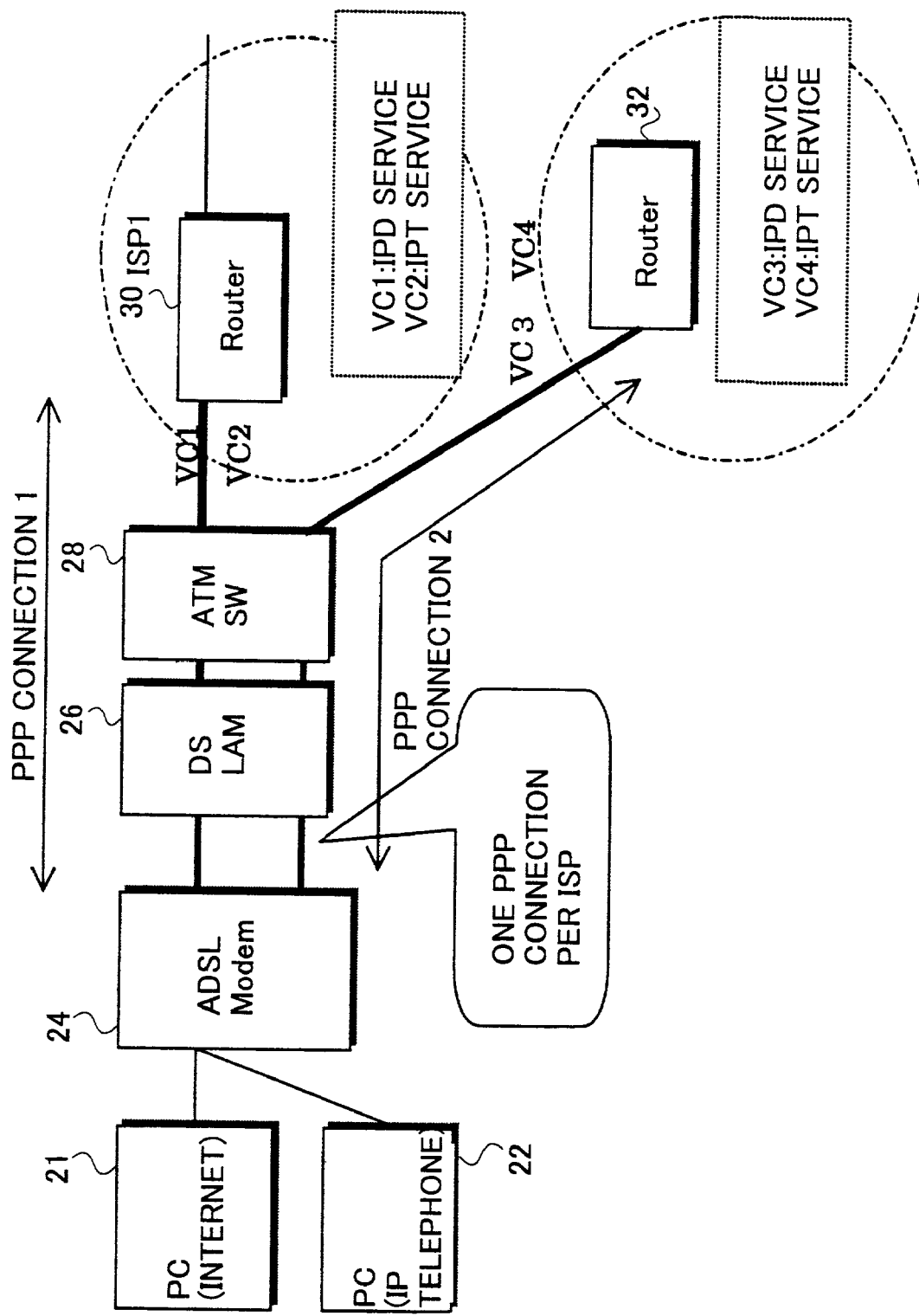
FIG. 3 is a block diagram showing the configuration of an ADSL system which uses the DSL communication method of the present invention.

FIG. 3 shows the configuration of an ADSL system which uses the DSL communication method of the present invention.

In the ADSL system of FIG. 3, a personal computer (PC) 22 for the IP telephone service and a personal computer (PC) 21 for the Web access service are connected to an ADSL modem 24 by the LAN. The ADSL modem 24 is connected to a telephone office site DSLAM (DSL Access Multiplexer) 26 by the ADSL circuit. The DSL modem 24 processes the various communication protocols for the Internet connection. The DSLAM 26 carries out the multiplexing and termination of the ADSL circuit, and it is connected to an ATM (Asynchronous Transfer Mode) switch 28. The ATM switch 28 is connected to each of a router 30 at the site of an Internet service provider ISP1 and a router 32 at the site of another Internet service provider ISP2. The routers 30 and 32 perform the routing of IP data, the authentication for Internet connection, and the protocol conversion. The user-site ADSL modem 24 is connected to the Internet through one of these routers 30 and 32.

In the ADSL modem 24, when a PPP connection is made for each provider ISP, a plurality of VC values are correlated to the PPP connection. When the router of a certain provider supports the IP data service (IPD) and the IP telephone service (IPT), the ADSL modem 24 according to the present invention performs this function so that the VC value is changed and managed for each of these services. Moreover, according to the present invention, it is possible to manage the priority for each of the plurality of VC values.

According to the present invention, one of such IP services is selected by setting the VC value, and it is possible to manage the priority for each VC value in the DSLAM 26 and the ATM switch 28. It is possible to design and manage the priority in the whole ADSL service. Moreover, when it is necessary to connect the ADSL modem 24 to two or more providers (the routers 30 and 32), a PPP connection is made to each provider and a plurality of VC values are correlated to each PPP connection.

Figure 4:
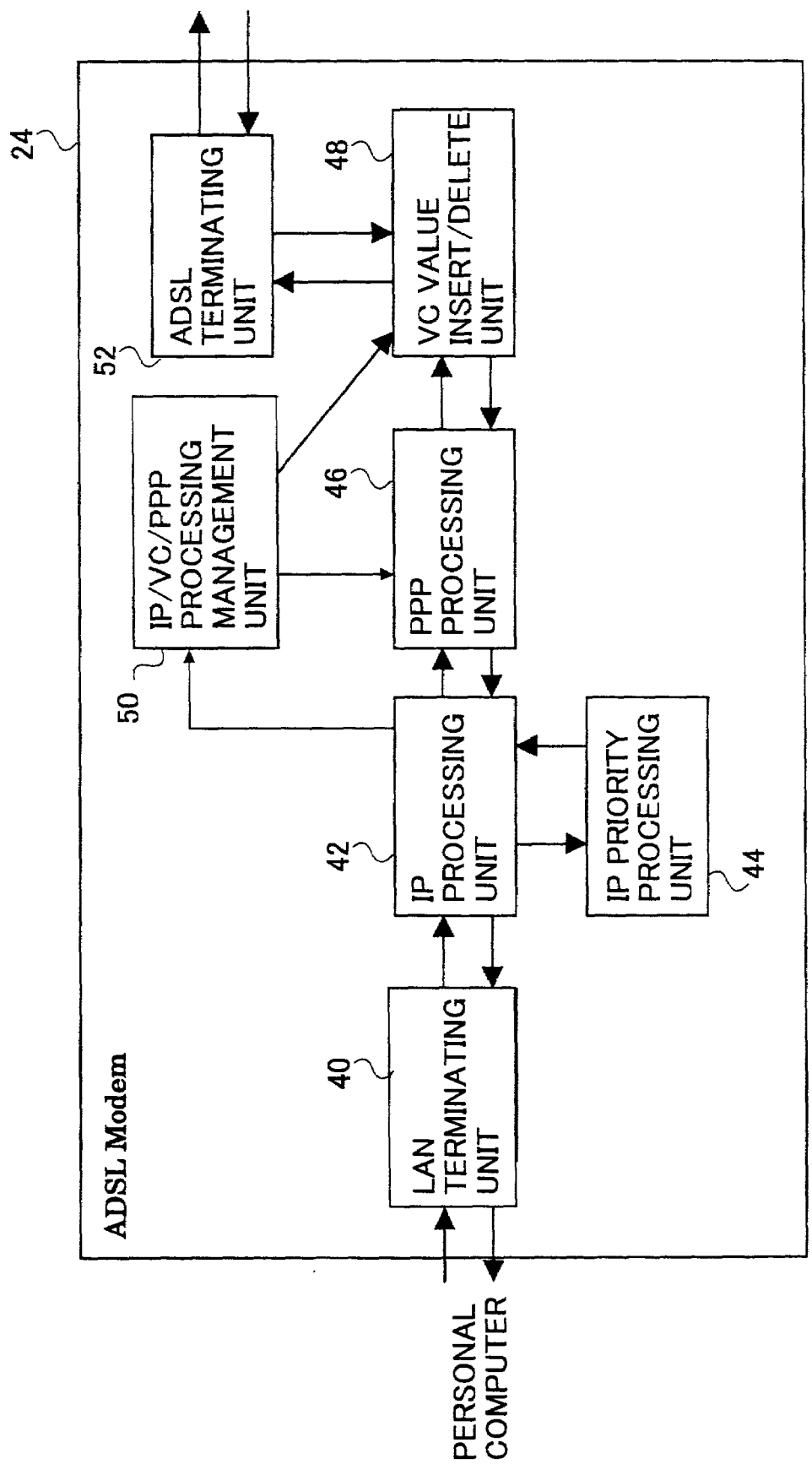
FIG. 4 is a block diagram of a first embodiment of an ADSL modem of the present invention.

FIG. 4 shows a first embodiment of the ADSL modem of the present invention.

As shown in FIG. 4, in the present embodiment, the LAN terminating unit 40 deletes a MAC header from the LAN frame that is sent from a personal computer. The LAN terminating unit 40 extracts the IP data containing the IP header from the LAN frame. The LAN terminating unit 40 sends the IP data containing the IP header to the IP processing unit 42. The IP processing unit 42 extracts the header information from the IP data.

The IP data containing the IP header from the IP processing unit 42 is sent to the PPP processing unit 46. In addition, the extracted header information from the IP processing unit 42 is sent to each of the IP/VC/PPP processing management unit 50 and the IP priority processing unit 44. In the IP processing unit 42, the VC priority processing is performed under the control of the IP priority processing unit 44. The IP priority processing unit 44 outputs the IP data according to a priority class defined in a VC value management table (which will be described later) of the IP/VC/PPP processing management unit 50 for a sender IP address of the received IP data. Hereinafter, the header information includes a sender IP address, a receiver IP address, a type of service (TOS) and so on.

The PPP processing unit 46 performs PPP connection processing automatically when the IP data containing the IP header is received. The PPP frame from the PPP processing unit 46 is sent to the VC value insert/delete unit 48. The VC value insert/delete unit 48 generates an ATM cell by setting one of the plurality of VC values to the input IP data based on the contents of a VC value management table of the IP/VC/PPP processing management unit 50. The ADSL modem 24 outputs the ATM cell according to the priority class defined for the VC value contained in the ATM cell. The IP data after the VC priority processing is sent to the ADSL terminating unit 52, and it is transmitted to the provider-site router.

On the other hand, the IP data of the ATM cell base from the router is received at the ADSL terminating unit 52, and the VC value insert/delete unit 48 deletes the VC value in the received IP data. The priority processing is performed under the control of the IP priority processing unit 44. The LAN terminating unit 40 adds a MAC header to the IP data that is processed by the IP processing unit 42 through the PPP processing unit 46. The resulting IP data is sent to a personal computer over the LAN.

FIG. 5 shows a VC value management table used by the IP/VC/PPP processing management unit 50 in the ADSL modem in FIG. 4.

The VC value management table, shown in FIG. 5, is provided, in advance, for each provider ISP, and the setting of the plurality of VC values is given for each sender IP address. For example, the sender IP address "192.168.0.2" is set for the IP telephone service, the VC value 32 is assigned, while the sender IP address "192.168.0.5" or "192.168.0.6" is set for the Web access service, and the VC value 33 is assigned.

In addition, instead of the sender IP address, it is possible to set the plurality of VC values according to the receiver IP address, the port number, the TOS (Type Of Service) field or the like.

In the PPP processing unit 46, when the IP data containing the IP header is received, the PPP negotiation will be performed first and the information for connection (which is called a PPP connection) will be transmitted to the VC value insert/delete unit 48. Regarding the information for connection, the RFC1661 describes the link stop phase, the link establishment phase, the authentication phase, the network layer protocol phase and the link end phase.

The VC value insert/delete unit 48 obtains the VC value (for example, the VC value 32) from the contents of the VC value management table described above, and assigns it to the connection information (the PPP connection), and sends the IP data with the VC value 32 to the ADSL terminating unit 52.

If the VC value management table contains both the VC value 32 and the VC value 33 in the same group, one of the two can be used, and the PPP processing for the VC value is performed. Moreover, the VC value management table may be registered also in the router 30 at the site of the provider which is connected to the ADSL modem 24.

The following processing steps are performed in order to process two or more VC values in one PPP session.

(1) Two or more VC values registered in the IP/VC/PPP processing management unit 50 are managed as one group, and the group information is sent to the PPP processing unit 46. It is possible to have two or more groups in the case where two or more PPP sessions are managed.

(2) In the PPP processing unit 46, the VC value set for the group concerned is used within one PPP session based on the group information from the IP/VC/PPP processing management unit 50. Concerning the link stop phase, the link establishment phase, the authentication phase, the Network layer protocol phase or the link end phase, one or the plurality of VC values corresponding to the group concerned may be used. When the PPP session using the VC value of either of the groups is performed, the IP data wherein the VC value corresponding to the group concerned is set will be transmitted and received within the PPP session. Moreover, concerning the authentication and password processing, one VC value corresponding to the same group is used. The processing of other PPP sessions will be performed as one PPP session, and the plurality of VC values are correlated to one PPP session.

(3) Since a PPP session is processed between the user-site modem and the provider-site router, the same processing of the above items (1) and (2) is also performed by both the communication devices. Moreover, the group registration of VC values is performed by a manual operation. In addition, it is also possible to use the auto configuration function using the ATM, and in such a case the group registration of VC values can be performed automatically.

Figure 6:
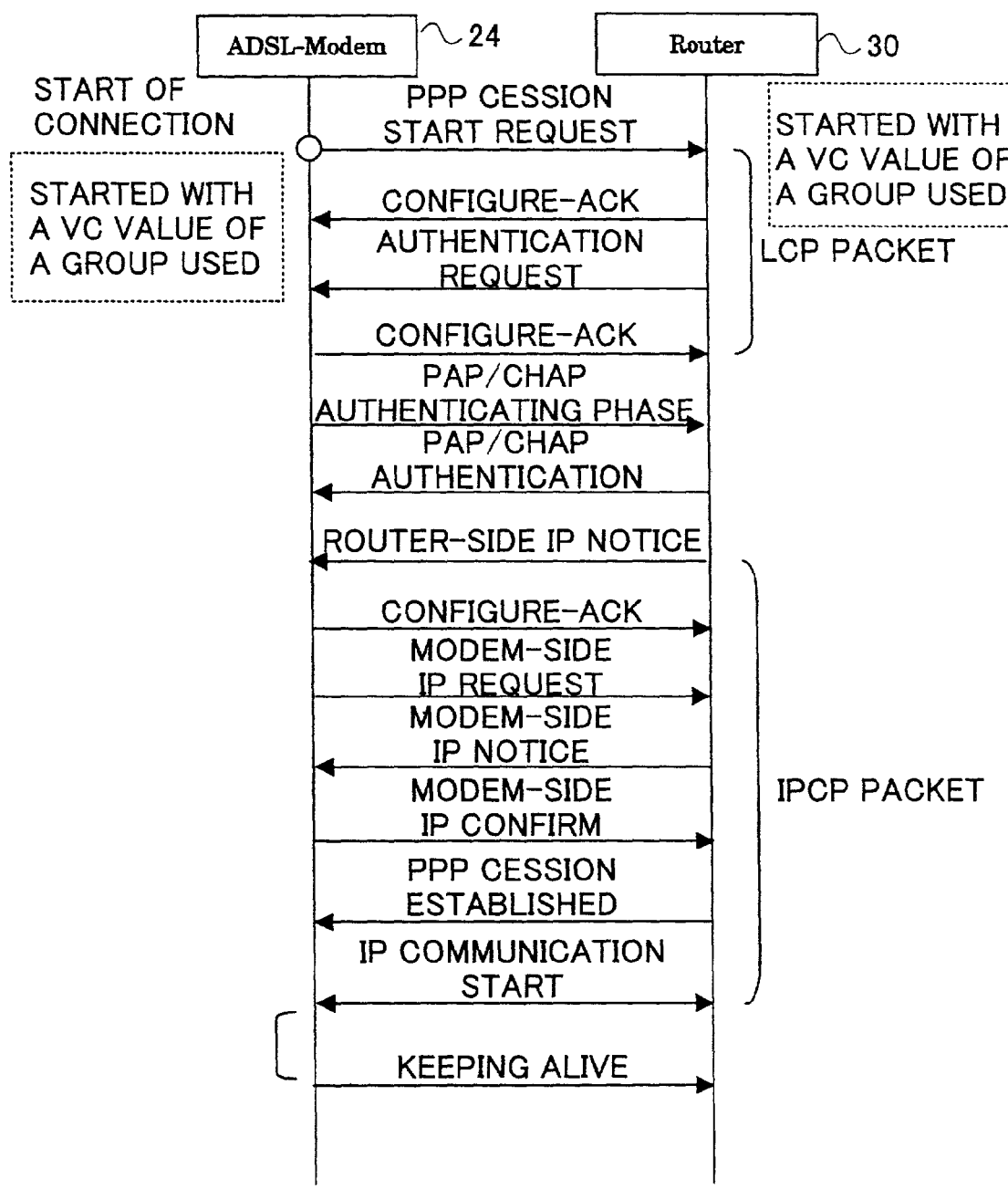
FIG. 6 is a diagram for explaining the sequence of PPP connection processing steps performed by the ADSL modem of the present embodiment.
Figure 7:
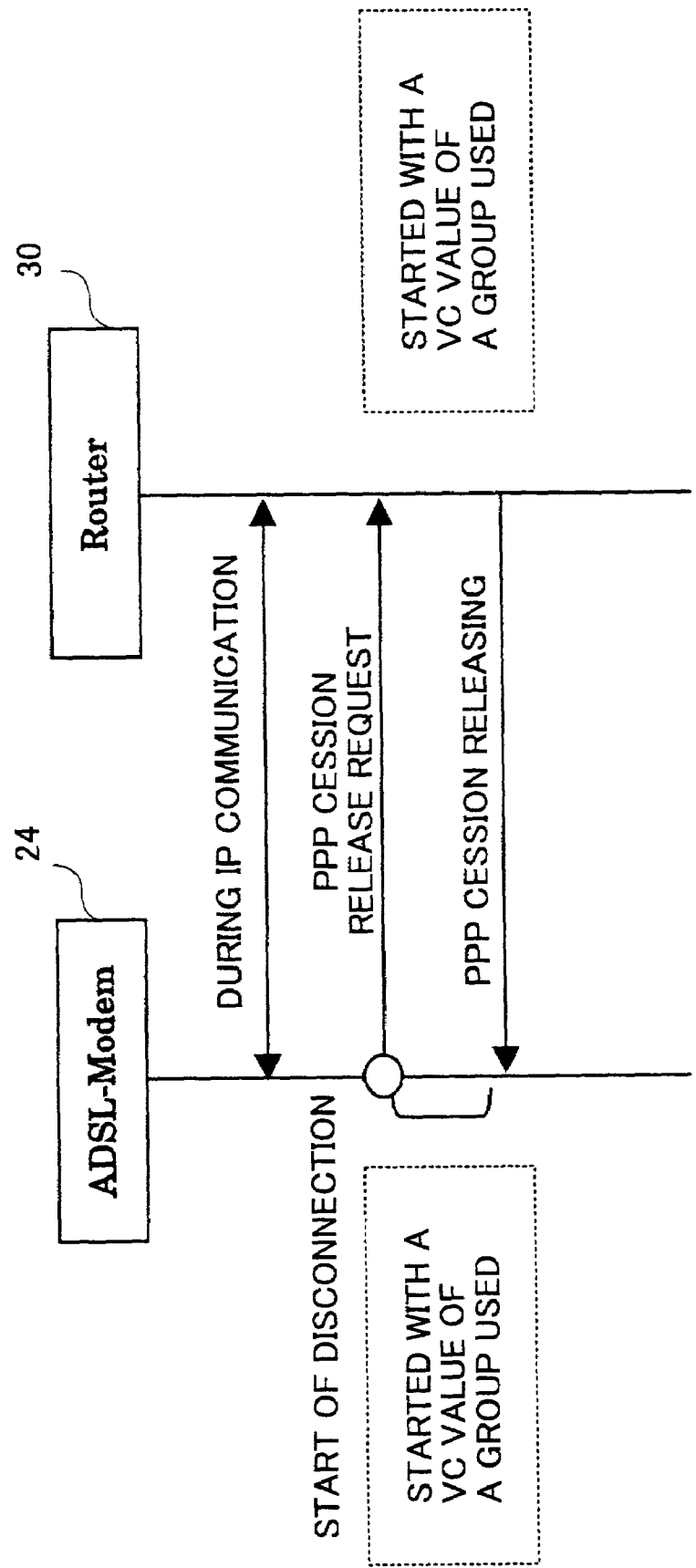
FIG. 7 is a diagram for explaining the sequence of PPP disconnection processing steps performed by the ADSL modem of the present embodiment.

FIG. 6 shows the sequence of PPP connection processing steps performed by the ADSL modem 24 of the present embodiment. FIG. 7 shows the sequence of PPP disconnection processing steps performed by the ADSL modem 24 of the present embodiment.

Figure 8:
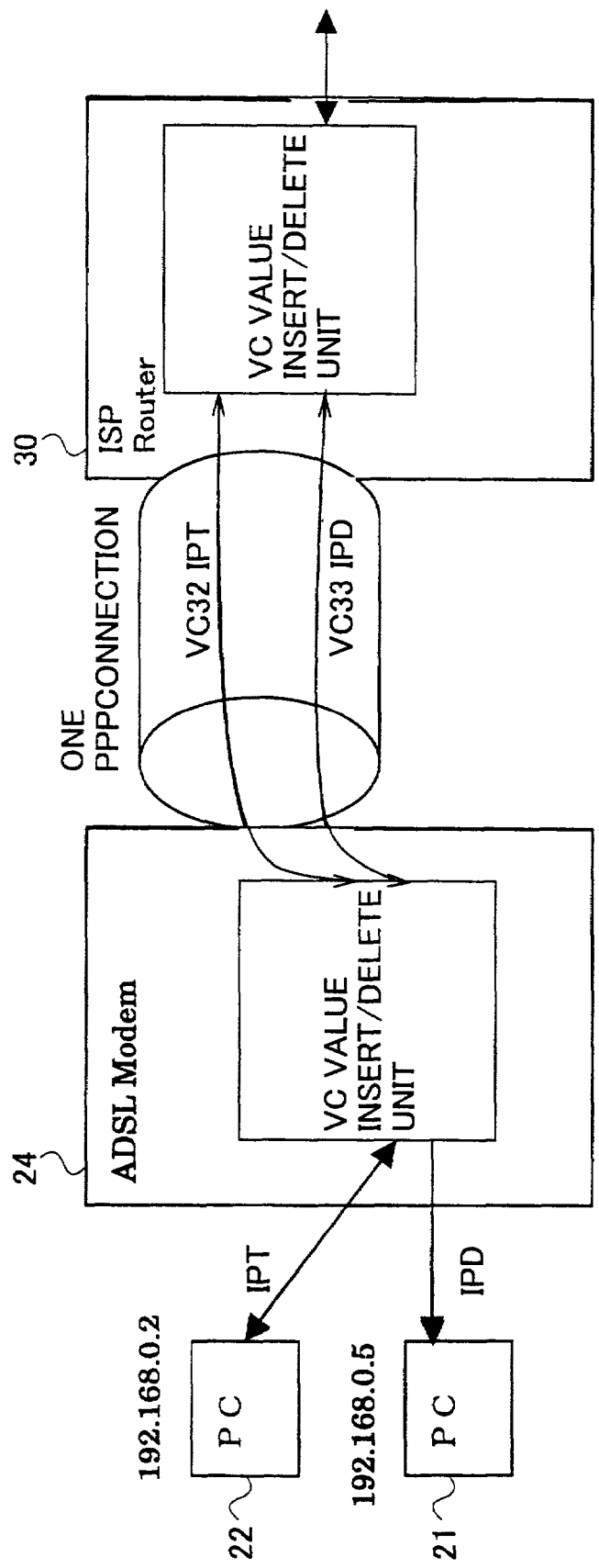
FIG. 8 is a diagram for explaining a PPP connection between the ADSL modem of the present embodiment and an ISP router.

The PPP connection processing is performed in response to the input of the sender IP address "192.168.0.2". The PPP connection is established by using the VC value 32 from the VC value management table. When the PPP connection is established and the sender IP address "192.168.0.5" is input thereafter, the VC value 33 is given to the IP data based on the VC value management table, the ATM cell is generated, and it is transmitted to the ADSL circuit connected to the router 30. FIG. 8 shows the above-described condition of a PPP connection between the ADSL modem 24 of the present embodiment and the router 30.

Figure 9:
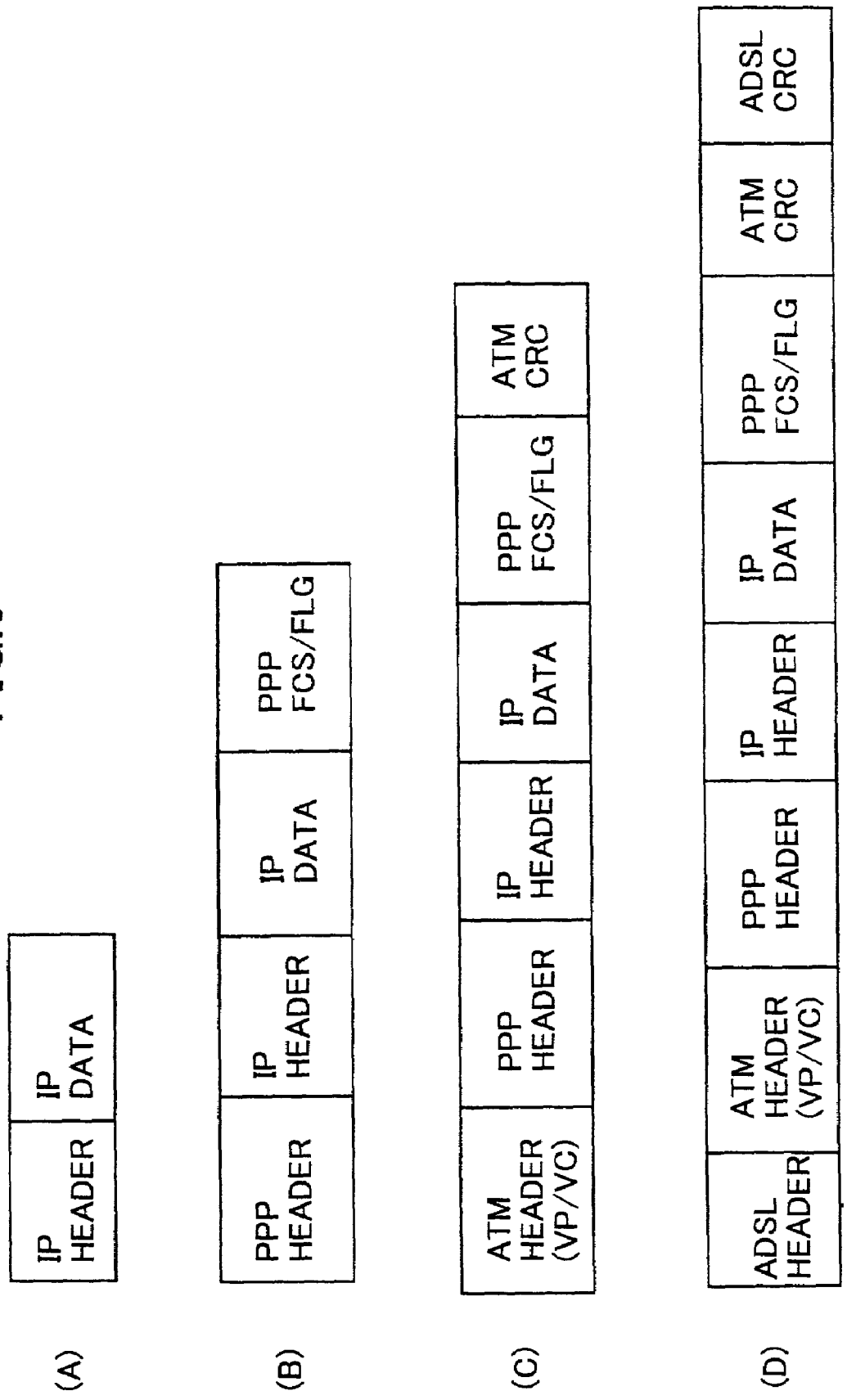
FIG. 9 is a diagram for explaining the format of the frame information used by each of respective units of the ADSL modem of the present embodiment.

FIG. 9 shows the format of the frame information used by each of the respective units of the ADSL modem 24 of the present embodiment.

As shown in FIG. 9(A), the IP processing unit 42 and the PPP processing unit 46 use the IP header and the IP data as the format of the frame information that is exchanged between them. As shown in FIG. 9(B), the PPP processing unit 46 and the VC value insert/delete unit 48 use the PPP header, the IP header, the IP data and the PPP-FCS (Frame Check Sequence) as the format of the frame information that is exchanged between them.

Moreover, as shown in FIG. 9(C), the VC value insert/delete unit 48 and the ADSL terminating unit 52 use the ATM header (with VC/VP included), the PPP header, the IP header, the IP data, the PPP-FCS and the ATM-CRC (Cyclic Redundancy Check) as the format of the frame information that is exchanged between them. As shown in FIG. 9(D), the ADSL terminating unit 52 and the DSLAM 26 use the ADSL header, the ATM header, the PPP header, the IP header, the IP data, the PPP-FCS, the ATM-CRC and the ADSL-CRC as the format of the frame information that is exchanged between them.

Figure 10:
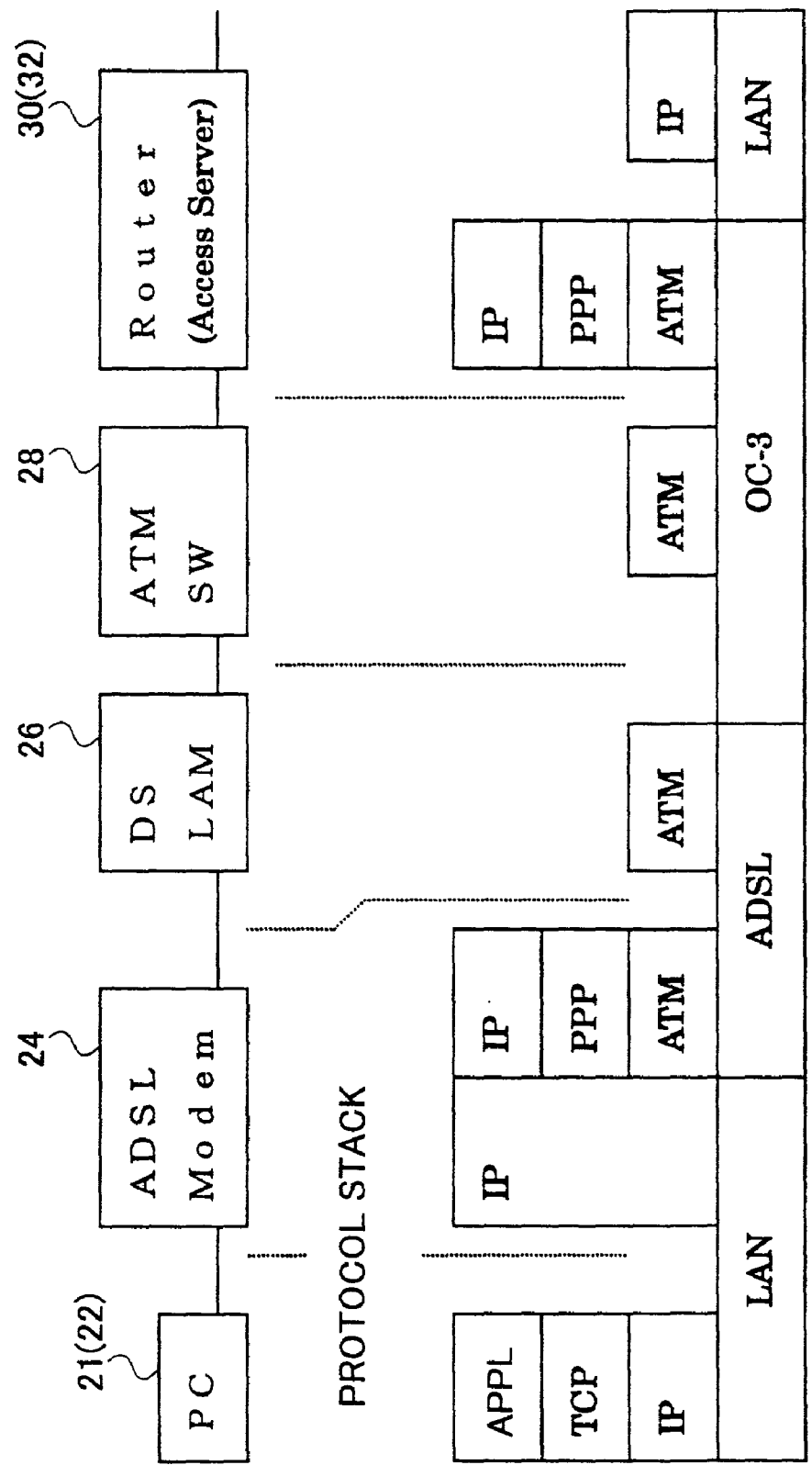
FIG. 10 is a diagram showing the protocol stack used by each of the respective units of the ADSL system.

In addition, FIG. 10 shows the protocol stack used by each of the respective units of the ADSL system 24 of the present embodiment.

Figure 11:
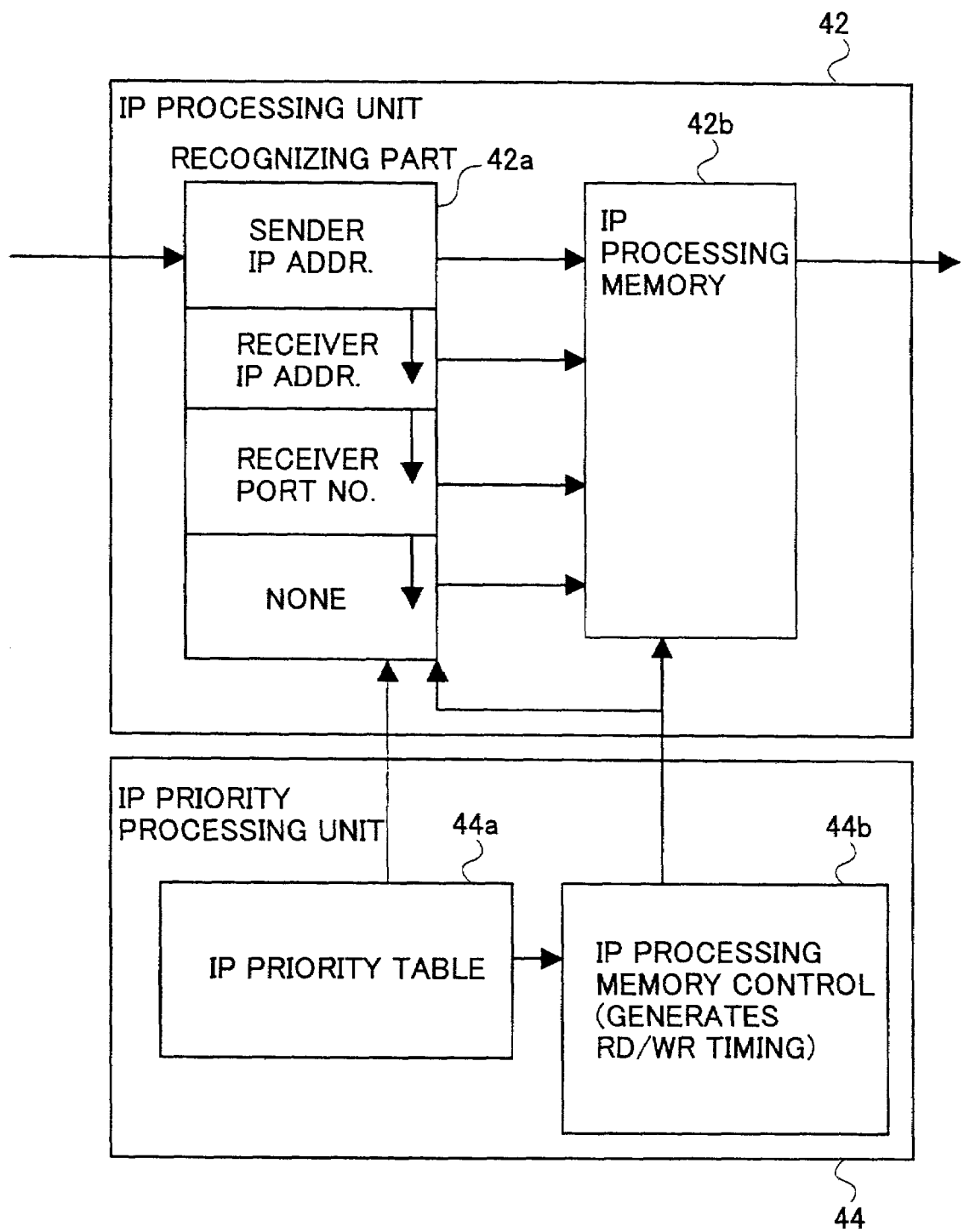
FIG. 11 is a block diagram showing the configuration of an IP processing unit and an IP priority processing unit in the present embodiment.

FIG. 11 shows the configuration of the IP processing unit 42 and the IP priority processing unit 44 in the present embodiment.

As shown in FIG. 11, the IP priority processing unit 44 performs priority control processing of the IP data that is received at the IP processing unit 42. The priority class, the band and others are set, in advance, in the IP priority table 44a of the IP priority processing unit 44 according to the sender IP address (or the receiver IP address or the receiver port number) of the IP data.

FIG. 12 shows the IP priority table 44a used by the IP priority processing unit 44 in the present embodiment.

As shown in FIG. 12, the priority rank (priority class) and the band are defined according to the sender IP address in this embodiment. As the sender IP address "192.168.0.2" is set for the IP telephone service, the priority class 1 and the band 64 Kbps are assigned. As the sender IP address "192.168.0.5" is defined for the Web access service, the priority class 2 is assigned and the best effort transmission method is used when there is a vacant band in the transmission line. In addition, the setting of the band is performed so as not to exceed the bit rate of the ADSL circuit.

The recognition unit 42a of the IP processing unit 42 recognizes the related item of the IP header (the sender IP address, the receiver IP address or the receiver port number) contained in the IP data that is sent from the LAN terminating unit 40. The recognition unit 42a compares the related item of the IP header with the sender IP address (or the receiver IP address or the receiver boat number) in the IP priority table 44a, and supplies the IP data to the IP processing memory 42b according to the priority class that is defined for the sender IP address in the IP priority table 44a. Moreover, the notification of the sending of the IP data to the IP processing memory 42b by the recognition unit 42a is sent to the IP processing memory controller 44b.

The memory area of the IP processing memory 42b is divided for each priority class, and the IP data is stored in each memory area according to the priority class. The IP processing memory controller 44b of the IP priority processing unit 44 generates a write timing signal in response to the notification sent from the recognition unit 42a, and supplies the timing signal to the IP processing memory 42b.

Moreover, according to the contents of each memory area of the IP processing memory 42b as well as the priority class from the IP priority table 44a, the IP processing memory controller 44b generates a read-out timing signal for each memory area, and supplies the timing signal to the IP processing memory 42b. The high priority is given to the IP data of the high memory area, and it is read from the IP processing memory 42b earlier, and sent to the PPP processing unit 46.

Figure 13:
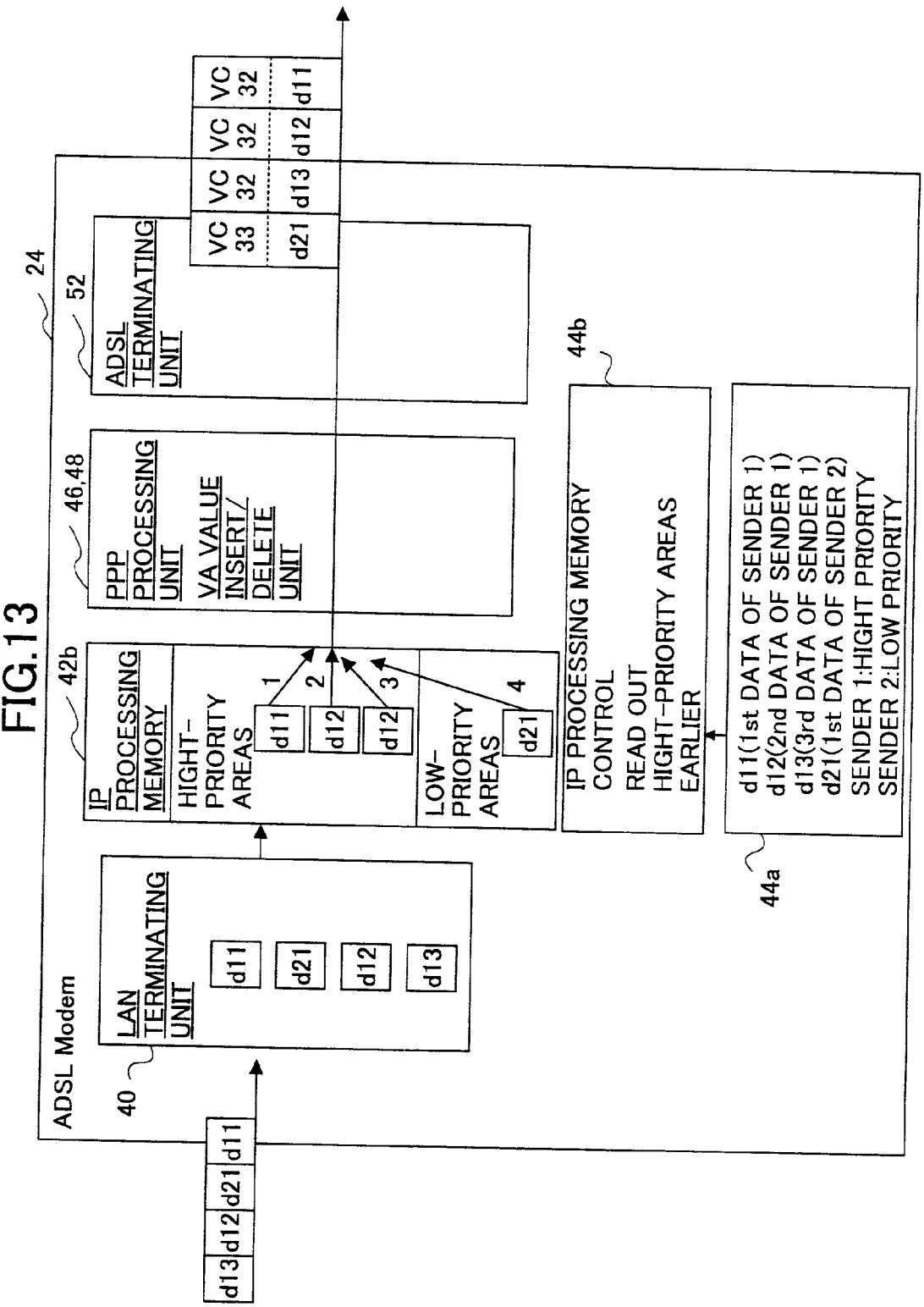
FIG. 13 is a diagram for explaining the state of the ADSL modem when performing the IP priority processing.

FIG. 13 shows the state of the ADSL modem 24 when performing the IP priority processing.

As shown in FIG. 13, the IP data d11 (the 1st data of the sender IP address 1), the IP data d21 (the 1st data of the sender IP address 2), the IP data d12 (the 2nd data of the sender IP address 1), and the IP data d13 (the 3rd data of the sender IP address 1) is inputted in this order. In addition, it is supposed that the sender IP address 1 has a high priority class since it is set for the IP telephone service, and the sender IP address 2 has a low priority class since it is ser for the Web access service.

In the example of FIG. 13, the d11, d12 and d13 which are the IP data of the sender IP address 1 are stored into the high priority memory area of the IP processing memory 42b, while the d21 which is the IP data of the sender IP address 2 is stored into the low priority memory area of the memory 42b. And the IP data d11, d12 and d13 are read, in this order, earlier from the high priority memory area of the IP processing memory 42b under the control of the IP processing memory controller 44b. The IP data d21 is read from the low priority memory area of the memory 42b next. The IP data d11, d12 and d13 are sent to the ADSL circuit together with the VC value 32. The IP data d21 is sent to the ADSL circuit together with the VC value 33.

Figure 14:
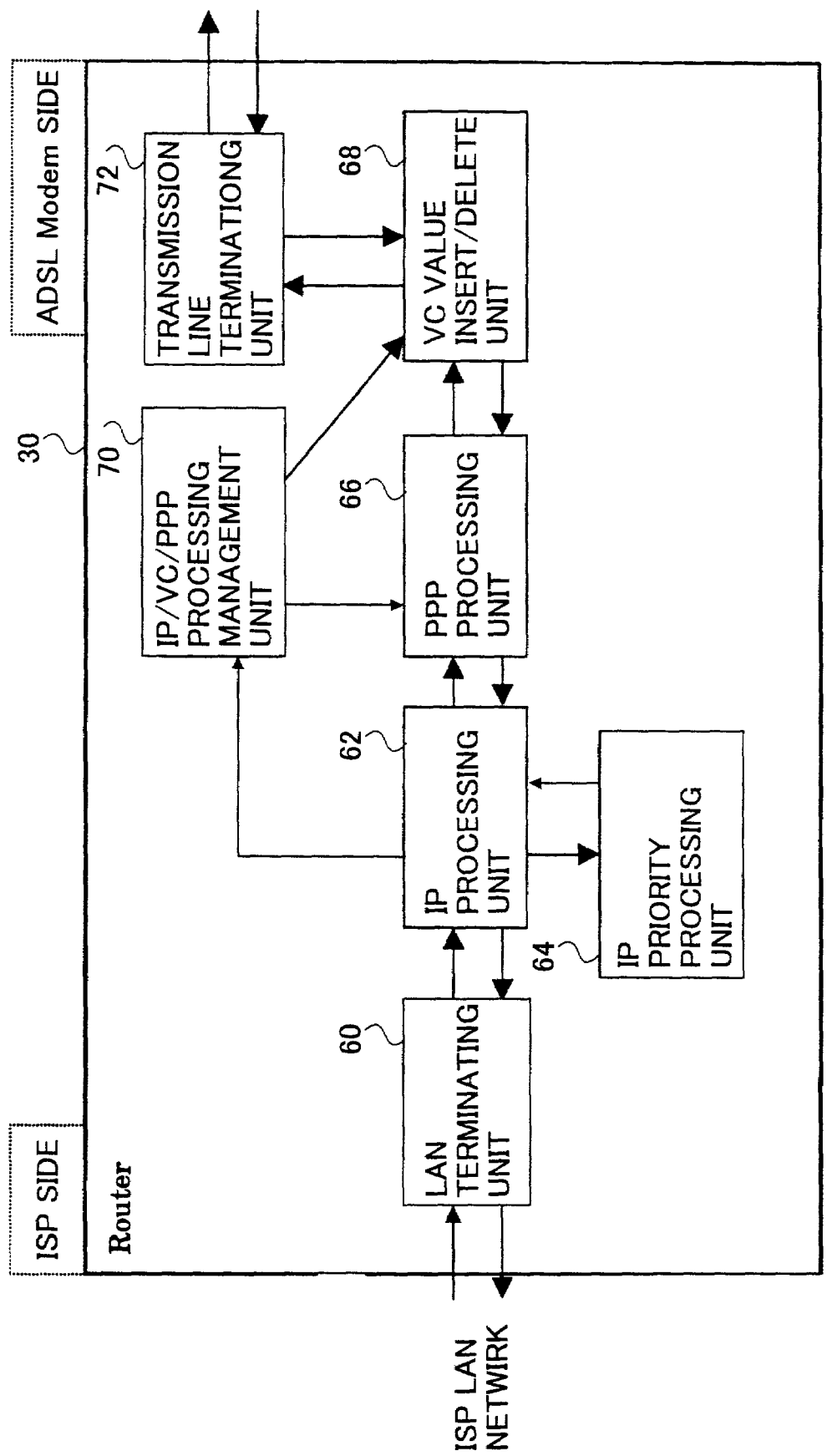
FIG. 14 is a block diagram of a first embodiment of the router of the present invention.

FIG. 14 shows the configuration of a first embodiment of the router 30 which is connected to the ADSL modem 24 in FIG. 4.

As shown in FIG. 14, in the present embodiment, the LAN terminating unit 60 deletes a MAC header from the LAN frame that is sent from a personal computer. The LAN terminating unit 60 extracts the IP data containing the IP header from the LAN frame. The LAN terminating unit 60 sends the IP data containing the IP header to the IP processing unit 62. The IP processing unit 62 extracts the header information from the IP data.

The IP data containing the IP header from the IP processing unit 62 is sent to the PPP processing unit 66. In addition, the extracted header information from the IP processing unit 62 is sent to each of the IPIVC/PPP processing management unit 70 and the IP priority processing unit 64. In the IP processing unit 62, the VC priority processing is performed under the control of the IP priority processing unit 64. The IP priority processing unit 64 outputs the IP data according to a priority class defined in a VC value management table (which will be described later) of the IP/VC/PPP processing management unit 70 for the sender IP address of the received IP data.

The PPP processing unit 66 performs PPP connection processing automatically when the IP data containing the IP header is received. The PPP frame from the PPP processing unit 66 is sent to the VC value insert/delete unit 68. The VC value insert/delete unit 68 generates an ATM cell by setting one of the plurality of VC values to the input IP data based on the contents of a VC value management table of the IP/VC/PPP processing management unit 70. The router 30 outputs the ATM cell according to the priority class defined for the VC value contained in the ATM cell. The IP data after the VC priority processing is sent to the ADSL terminating unit 72, and it is transmitted to the provider-site router.

On the other hand, the IP data of the ATM cell base from the router is received at the ADSL terminating unit 72, and the VC value insert/delete unit 68 deletes the VC value in the received IP data. The priority processing is performed under the control of the IP priority processing unit 64. The LAN terminating unit 60 adds a MAC header to the IP data that is processed by the IP processing unit 62 through the PPP processing unit 66. The resulting IP data is sent to a personal computer over the LAN.

Figure 15:
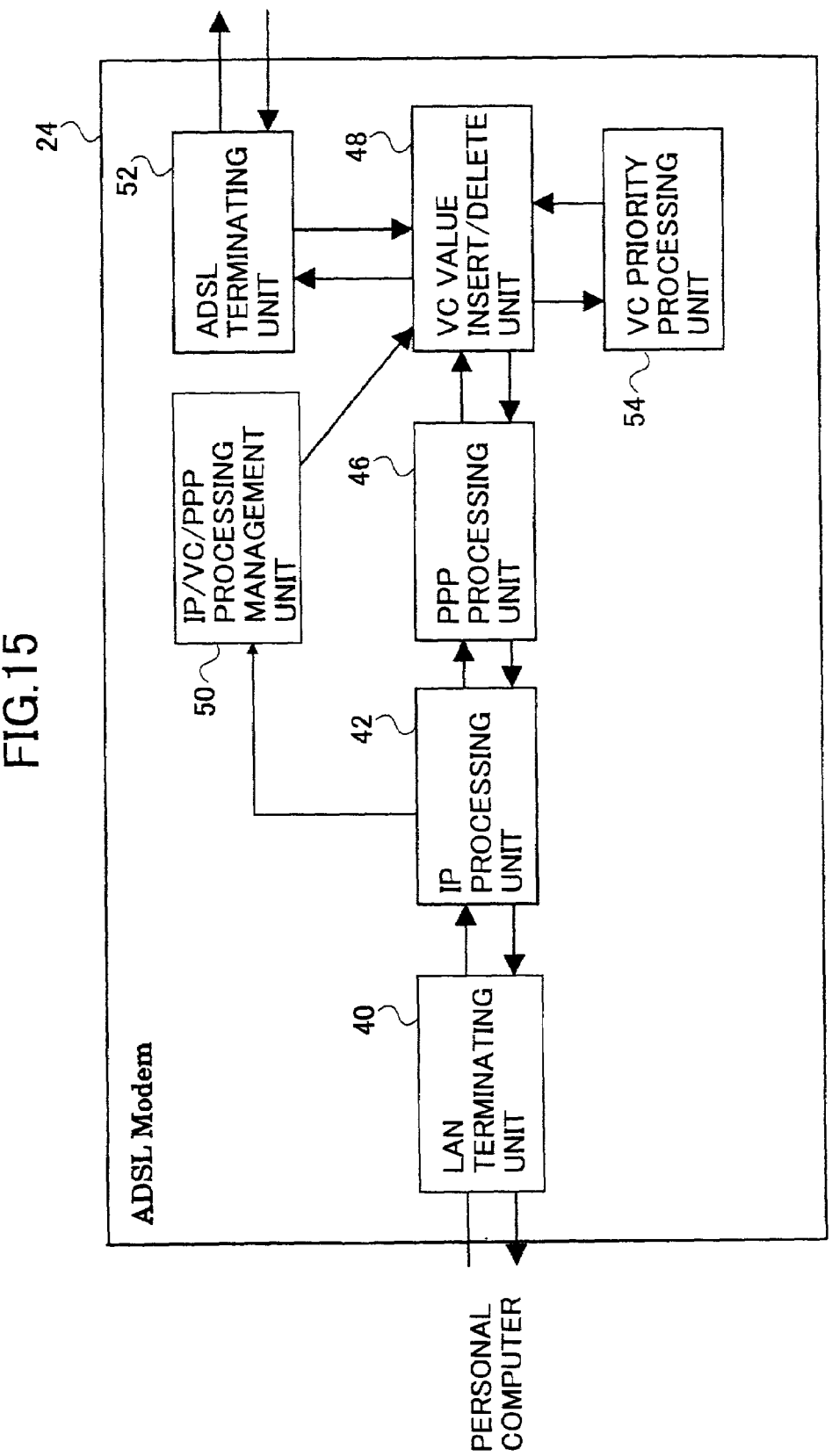
FIG. 15 is a block diagram of a second embodiment of the ADSL modem of the present invention.

FIG. 15 shows the configuration of a second embodiment of the ADSL modem 24 of the present invention.

In FIG. 15, the elements that are essentially the same as corresponding elements in FIG. 4 are designated by the same reference numerals, and a description thereof will be omitted.

As shown in FIG. 15, in the present embodiment, the LAN terminating unit 40 deletes a MAC header from the LAN frame that is sent from a personal computer. The LAN terminating unit 40 extracts the IP data containing the IP header from the LAN frame. The LAN terminating unit 40 transmits the IP data containing the IP header to the IP processing unit 42. The IP processing unit 42 extracts the header information from the IP data.

The IP data containing the IP header from the IP processing unit 42 is sent to the PPP processing unit 46. In addition, the extracted header information from the IP processing unit 42 is sent to the IP/VC/PPP processing management unit 50. The PPP processing unit 46 performs PPP connection processing automatically when the IP data containing the IP header is received. The PPP frame from the PPP processing unit 46 is sent to the VC value insert/delete unit 48. The VC value insert/delete unit 48 generates an ATM cell by setting one of the plurality of VC values to the input IP data based on the contents of the VC value management table of the IP/VC/PPP processing management unit 50. The VC priority processing unit 54 outputs the ATM cell according to the priority class defined for the VC value contained in the ATM cell. The VC priority processing for the IP data of the ATM cell base where the VC value is given is performed by the control of the VC priority processing unit 54. The IP data after the VC priority processing is sent to the ADSL terminating unit 52, and it is transmitted to the provider-site router.

On the other hand, the IP data of the ATM cell base from the router is received at the ADSL terminating unit 52, and the VC value insert/delete unit 48 deletes the VC value in the received IP data. The priority processing is performed under the control of the VC priority processing unit 54. The LAN terminating unit 40 adds a MAC header to the IP data that is processed by the IP processing unit 42 through the PPP processing unit 46. The resulting IP data is sent to a personal computer over the LAN.

The VC priority processing unit 54 performs priority processing of an ATM cell based on the VC value contained in the ATM cell. Alternatively, the VC priority processing unit 54 may perform the priority processing based on a CLP (Cell Loss Priority) contained in the ATM cell header. As the priority class defined for each VC value, UBR (Unspecified Bit Rate), CBR (Constant Bit Rate) or others may be used. Alternatively, the setting of the band may be used instead of the priority class.

Figure 16:
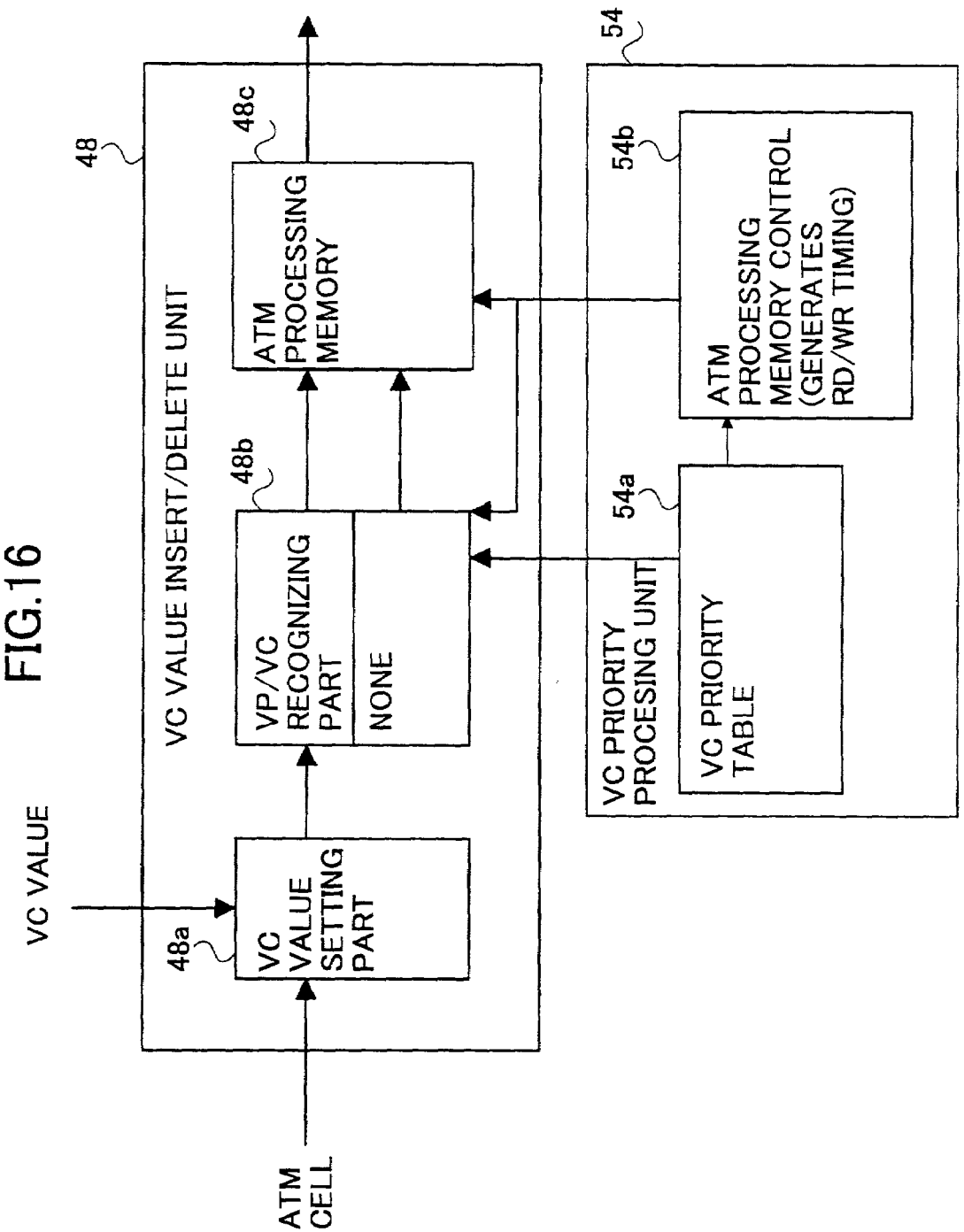
FIG. 16 is a block diagram showing the configuration of a VC value insert/delete unit and a VC priority processing unit in the present embodiment.

FIG. 16 shows the configuration of the VC value insert/delete unit 48 and the VC priority processing unit 54.

As shown in FIG. 16, the VC priority processing unit 54 performs priority control processing of the IP data of the ATM cell base that is sent to the VC value insert/delete unit 48. The priority class (QOS), the band and others are defined, in advance, in the VC priority table 54a of the VC priority processing unit 54 for each of a plurality of VC values.

FIG. 17 shows the VC priority table 54a used by the ADSL modem 24 of the present embodiment.

As shown in FIG. 17, the VC value 32 is set for the IP telephone service, and the priority class CBR (constant bit rate) and the band 64 Kbps are assigned. As the VC value 33 is set for the Web access service, the priority class UBR (unspecified bit rate) is assigned. As the VC value 34 is set for the IP telephone service, the priority class CBR and the band 64 Kbps are assigned. In addition, the setting of the band is performed so as not exceed the bit rate of the ADSL circuit.

The VC value setting part 48a of the VC value insert/delete unit 48 sets a VC value to the ATM cell of the IP data which is sent from the PPP processing unit 46, the VC value being supplied from the IP/VC/PPP processing management unit 50. The VC value setting part 48a sends the ATM cell to the VP/VC recognizing part 48b. The VP/VC recognizing part 48b recognizes the VC value contained in the ATM cell. The VP/VC recognizing part 48b supplies the received ATM cell to the ATM processing memory 48c according to the priority class that is defined in the table 54a for the VC value contained in the ATM cell. Furthermore, the notification of the sending of the ATM cell to the IP processing memory 42b by the recognition part 48b is sent to the IP processing memory controller 54b.

The memory area of the ATM processing memory 48c is divided for each of the priority classes, and the ATM cell is stored into the related memory area for the priority class thereof. The ATM processing memory controller 54b of the VP priority processing unit 54 generates a write timing signal in response to the notification from the VP/VC recognizing part 48b, and supplies the timing signal to the ATM processing memory 48c. Moreover, according to the IP data stored in the related memory area of the ATM processing memory 48c and the priority class defined in the VC priority table 54a, the ATM processing memory controller 54b generates a read-out timing signal for each memory area, and supplies the timing signal to the ATM processing memory 48c. The priority class is given to the ATM cell of the memory area, and the ATM cell is read from the ATM processing memory 48c earlier if the priority class is high. The read ATM cell is transmitted to the ADSL terminating unit 52.

Figure 18:
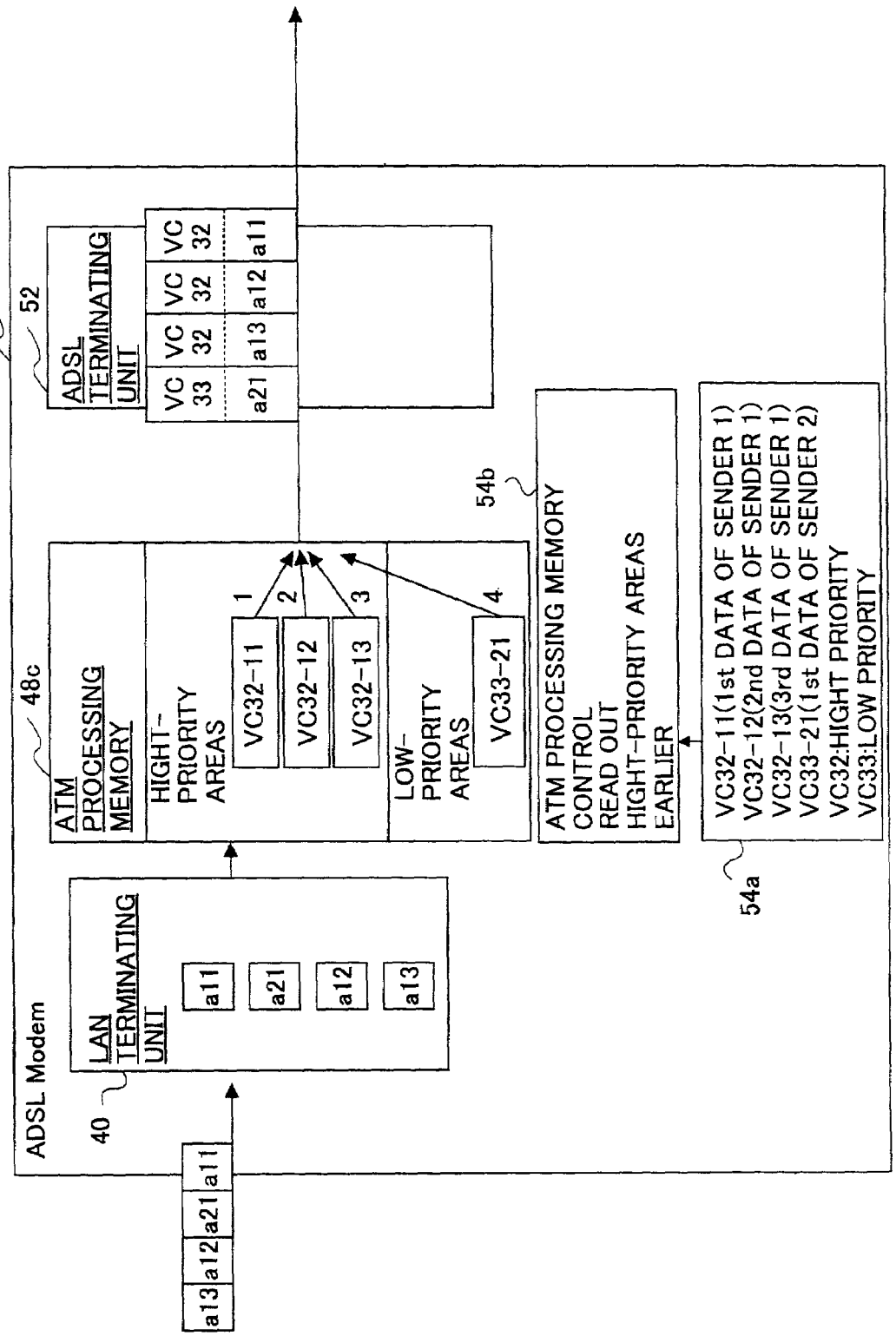
FIG. 18 is a diagram for explaining the state of the ADSL modem when performing the VC priority processing.

FIG. 18 shows the state of the ADSL modem 24 of the present embodiment when performing the VC priority processing.

As shown in FIG. 18, the ATM cell a11 (the first ATM cell of the sender IP address 1), the ATM cell a21 (the first ATM cell of the sender IP address 2), the ATM cell a12 (the second ATM cell of the sender IP address 1), and the ATM cell a13 (the third ATM cell of the sender IP address 1) are sent to the ADSL modem 24 in this order.

In addition, it is supposed that the sender IP address 1 is related to the IP telephone service and a high priority class is defined for the VC value 32 of the sender IP address 1, and that the sender IP address 2 is related to the Web access service and a low priority class is defined for the VC value 33 of the sender IP address 2.

In the example of FIG. 18, the ATM cells a11, a12 and a13 of the VC value 32 are stored into the high priority memory area of the ATM processing memory 48c, and the ATM cell a21 of the VC value 33 is stored into the low priority memory area of the ATM processing memory 48c. Moreover, the ATM cells a11, a12, and a13 are read in this order from the high priority memory area of the ATM processing memory 48c under the control of the ATM processing memory controller 54b. The ATM cell a21 is read from the low priority memory area of the ATM processing memory 48c last. These ATM cells are transmitted to the ADSL circuit connected to the router.

Accordingly, by performing the VC priority processing, the IP data of the IP telephone service to which the priority class CBR is set can be preferentially processed to the IP data of the Web access service to which the priority class UBR is set. It is possible to provide the IP telephone service and the Web access service such that the permissible bandwidth is not exceeded.

Figure 19:
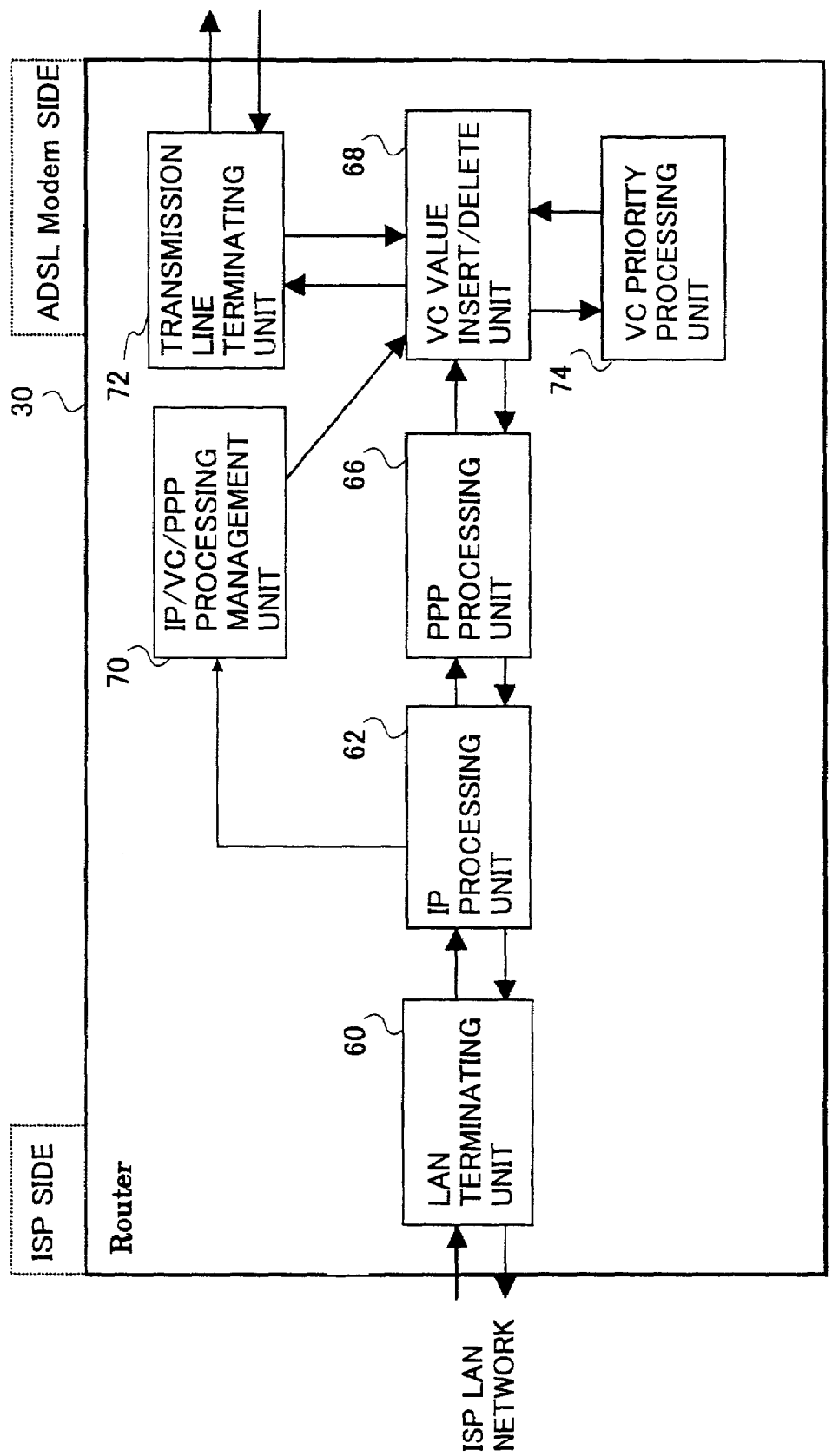
FIG. 19 is a block diagram of a second embodiment of the router of the present invention.

FIG. 19 shows the configuration of a second embodiment of the router 30 of the present invention, which is connected to the ADSL modem 24 in FIG. 15.

In FIG. 19, the elements that are essentially the same as corresponding elements in FIG. 14 are designated by the same reference numerals, and a description thereof will be omitted.

As shown in FIG. 19, in the present embodiment, the LAN terminating unit 60 deletes a MAC header from the LAN frame that is sent from an ISP LAN network. The LAN terminating unit 60 extracts the IP data containing the IP header from the LAN frame. The LAN terminating unit 60 transmits the IP data containing the IP header to the IP processing unit 62. The IP processing unit 62 extracts the header information from the IP header, and supplies the extracted header information to the IP/VC/PPP processing management unit 70.

The IP data containing the IP header from the IP processing unit 62 is sent to the PPP processing unit 66. The PPP processing unit 66 performs PPP connection processing automatically when the IP data containing the IP header is received. The PPP frame from the PPP processing unit 66 is sent to the VC value insert/delete unit 68. Based on the contents of the VC value management table of the IP/VC/PPP processing management unit 70, the VC value insert/delete unit 68 generates an ATM cell by setting one of the plurality of VC values to the input IP data. The VC priority processing unit 74 outputs the ATM cell according to the priority class defined for the VC value contained in the ATM cell. The VC value insert/delete unit 68 performs the priority processing by the control of the VC priority processing unit 74. The IP data after the VC priority processing is transmitted to the ADSL modem through the transmission line terminating unit 72.

On the other hand, the IP data of the ATM cell base from the ADSL modem is received at the transmission line terminating unit 72, and the VC value insert/delete unit 68 deletes the VC value in the received IP data. The VC priority processing is performed under the control of the VC priority processing unit 74. After the IP data is processed by the IP processing unit 62 through the PPP processing unit 66, the LAN terminating unit 60 adds a MAC header to the IP data. The resulting IP data is sent out to the ISP LAN network. Thus, the router 30 of the present embodiment has the same configuration as the ADSL modem 24 which is connected to the router 30.

Figure 20:
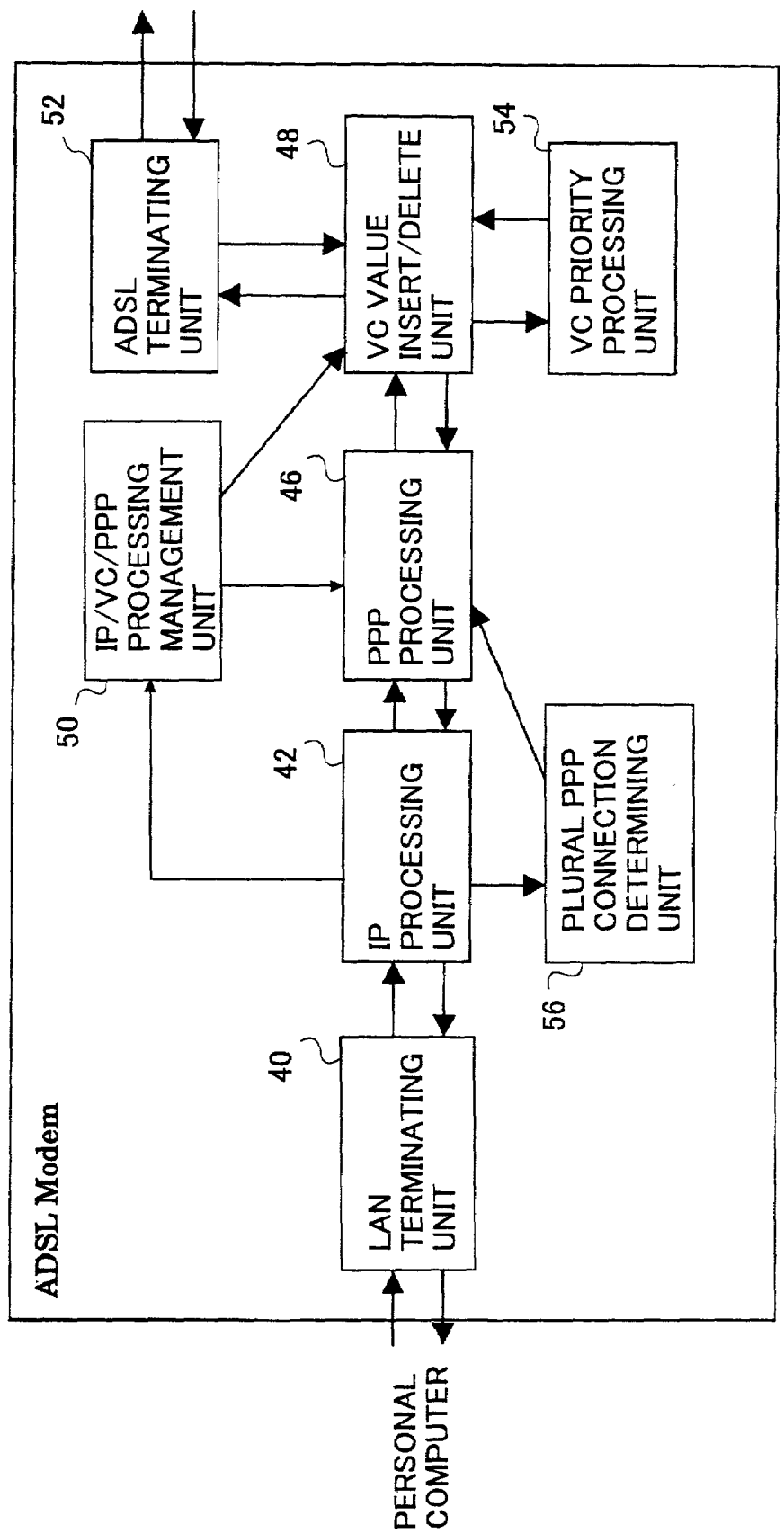
FIG. 20 is a block diagram of a third embodiment of the ADSL modem of the present invention.

FIG. 20 shows the configuration of a third embodiment of the ADSL modem 24 of the present invention.

In FIG. 20, the elements that are essentially the same as corresponding elements in FIG. 15 are designated by the same reference numerals, and a description thereof will be omitted.

As shown in FIG. 20, in the present embodiment, the LAN terminating unit 40 deletes a MAC header from the LAN frame that is sent from a personal computer. The LAN terminating unit 40 extracts the IP data containing the IP header from the LAN frame. The LAN terminating unit 40 transmits the IP data containing the IP header to the IP processing unit 42. The IP processing unit 42 extracts the header information from the IP data. The IP data containing the IP header from the IP processing unit 42 is sent to the PPP processing unit 46. In addition, the extracted header information from the IP processing unit 42 is sent to both the IP/VC/PPP processing management unit 50 and the plural PPP processing unit 56.

The plural PPP connection judgment unit 56 has a PPP group table. The plural PPP connection determining unit 56 supplies two or more PPP numbers corresponding to the IP address of the PPP group table to the PPP processing unit 46. A PPP number is a number given for every ISP, and shows that the difference in this number makes two or more PPP connections. This makes it possible to establish the PPP connection for each ISP provider when the user has the IP service contracts with two or more ISP providers.

The PPP processing unit 46 performs PPP connection processing automatically when the IP data containing the IP header is received. The PPP frame from the PPP processing unit 46 is sent to the VC value insert/delete unit 48. The VC value insert/delete unit 48 generates an ATM cell by setting one of the plurality of VC values to the input IP data based on the contents of the VC value management table of the IP/VC/PPP processing management unit 50. The VC priority processing unit 54 outputs the ATM cell according to the priority class defined for the VC value contained in the ATM cell. The VC priority processing for the IP data of the ATM cell base where the VC value is given is performed by the control of the VC priority processing unit 54. The IP data after the VC priority processing is sent to the ADSL terminating unit 52, and it is transmitted to the provider-site router.

On the other hand, the IP data of the ATM cell base from the router is received at the ADSL terminating unit 52, and the VC value insert/delete unit 48 deletes the VC value in the received IP data. The priority processing is performed under the control of the VC priority processing unit 54. The LAN terminating unit 40 adds a MAC header to the IP data that is processed by the IP processing unit 42 through the PPP processing unit 46. The resulting IP data is sent to a personal computer over the LAN.

FIG. 21 shows a PPP group table used by the ADSL modem of the present embodiment.

In the PPP group table of FIG. 21, the assignment of the PPP group numbers and the VC values is made according to each of the plurality of sender IP addresses. For example, the sender IP address "192.168.0.2" is set for the IP telephone service, and the VC value 32 and the PPP group number 1 are assigned. As the sender IP address "192.168.0.5" is set for the Web access service, and the VC value 33 and the PPP group number 1 are assigned. As the sender IP address "192.168.0.6" is set for the IP telephone service, the VC value 34 and the PPP group number 2 are assigned. As the sender IP address "192.168.0.7" is set for the Web access service, the VC value 35 and the PPP group number 2 are assigned.

Figure 22:
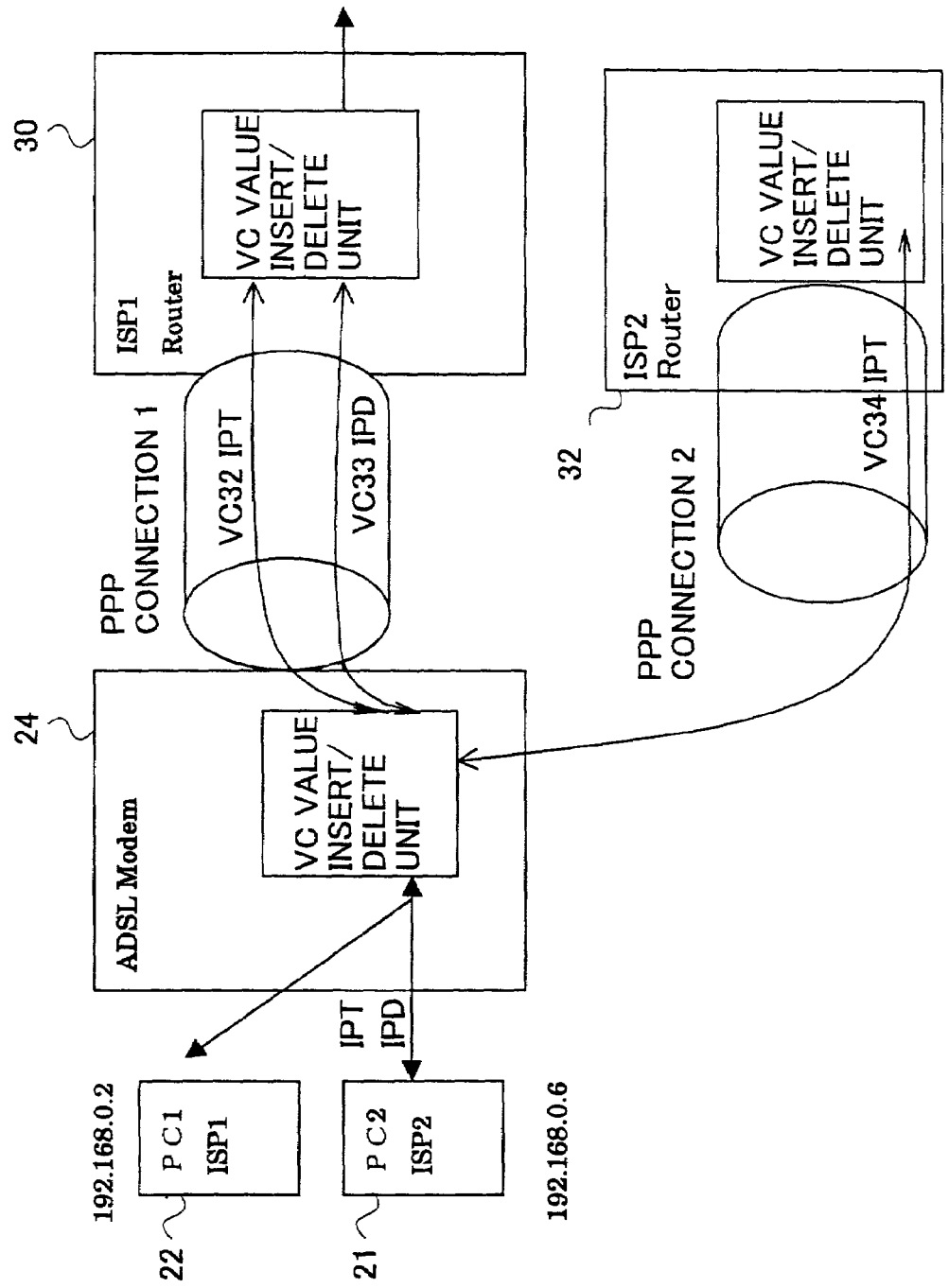
FIG. 22 is a diagram showing the state of the ADSL modem when performing the PPP connection between the modem and the router.

FIG. 22 shows the state of the ADSL modem 24 of the present embodiment when performing the PPP connection between the modem and the router.

As shown in FIG. 22, the ADSL modem 24 of this embodiment performs the PPP connection processing as follows. When the IP data from the sender IP address "192.168.0.2", which is the personal computer 22 having the contracted provider ISP1, is received, the modem 24 is connected to the router 30 at the site of the provider ISP1 by the PPP connection 1 that uses the VC value 32 defined in the PPP group table. Moreover, when the IP data from the sender IP address "192.168.0.6", which is the personal computer 21 having the contracted provider ISP2, the modem 24 is connected to the router 32 at the site of the provider ISP2 by the PPP connection 2 that uses the VC value 34 defined in the PPP group table.

In the above-described embodiment of FIG. 20, separately from the VC value management table of the IP/VC/PPP processing management unit 50, the PPP group table is provided in the plural PPP connection determining unit 56. Alternatively, the PPP group table may be incorporated in the VC value management table of the management unit 50.

As described in the foregoing, according to the present invention, when receiving the IP telephone service and the Web access service simultaneously, the priority can be given to the IP telephone service over the Web access service and it is possible to increase the quality of the IP telephone voice. When a large quantity of the data of the IP telephone and Web access is transmitted, it is possible for the present invention to prevent the occurrence of the noise in the IP telephone voice. Thus, the user does not need to take measures to maintain good quality of the IP telephone voice while receiving the Web access service at the same time.

In the above-mentioned embodiments, the DSL communication method and apparatus uses the ADSL as a typical example. The present invention is not limited to these embodiments. It is also applicable to other DSL communication methods and equipment using the existing two-wire telephone line, such as HDSL (High-bit-rate DSL), SDSL (Symmetric DSL) and VDSL (Very-high-bit-rate DSL).

In addition, the IP/VC/PPP processing management unit 50 or 70 in the above-mentioned embodiment corresponds to the VC management unit in the claims. The IP priority processing unit 44 or 64 in the above-mentioned embodiment corresponds to the IP data priority unit in the claims. The VC value insertion/deletion unit 48 or 68 in the above-mentioned embodiment corresponds to the ATM cell generating unit in the claims. The VC priority processing unit 54 or 74 in the above-mentioned embodiment corresponds to the ATM cell priority unit in the claims.

The present invention is not limited to the above-described embodiments, and variations and modifications may be made without departing from the scope of the present invention.

Further, the present invention is based on Japanese priority application No. 2001-335414, filed on Oct. 31, 2001, the entire contents of which are hereby incorporated by reference.

What is claimed is:

1. A digital subscriber line DSL communication method that provides mutual communications between a user-site DSL modem and a provider-site router by using an existing two-wire telephone line and an existing DSL communication technology, the method comprising the steps of:
   correlating a plurality of virtual channel values to a PPP connection between the modem and the router;
   receiving input IP data and outputting the IP data according to a priority class defined for a sender IP data contained in the input IP data;
   generating an ATM cell in which one of the plurality of virtual channel values corresponding to the sender IP data of the input IP data is assigned to the output IP data; and
   transmitting the resulting ATM cell to a DSL circuit connected to the router.

2. A digital subscriber line DSL communication method that provides mutual communications between a user-site DSL modem and a provider-site router by using an existing two-wire telephone line and an existing DSL communication technology, the method comprising the steps of:
   correlating a plurality of virtual channel values to a PPP connection between the modem and the router;
   generating an ATM cell by setting one of the plurality of virtual channel values corresponding to a sender IP data of an input IP data, to the input IP data;
   receiving the ATM cell and outputting the ATM cell according to a priority class defined for said one of the plurality of virtual channel values contained in the received ATM cell;
   transmitting the output ATM cell to a DSL circuit connected to the router.

3. A user-site digital subscriber line DSL modem that is connected to a provider-site router to provide mutual communications between the modem and the router by using an existing two-wire telephone line and an existing DSL communication technology, the DSL modem comprising:
   a VC management unit correlating a plurality of virtual channel values to a PPP connection between the modem and the router;
   an IP data priority unit receiving input IP data and outputting the IP data according to a priority class defined for a sender IP data contained in the input IP data; and
   an ATM cell generating unit generating an ATM cell in which one of the plurality of virtual channel values corresponding to the sender IP data of the input IP data is assigned to the output IP data,
   wherein the DSL modem transmits the resulting ATM cell to a DSL circuit connected to the router.

4. A user-site digital subscriber line DSL modem that is connected to a provider-site router to provide mutual communications between the modem and the router by using an existing two-wire telephone line and an existing DSL communication technology, the DSL modem comprising:
   a VC management unit correlating a plurality of virtual channel values to a PPP connection between the modem and the router;
   an ATM cell generating unit generating an ATM cell by setting one of the plurality of virtual channel values corresponding to a sender IP data of an input IP data, to the input IP data;
   an ATM cell priority unit receiving the ATM cell and outputting the ATM cell according to a priority class defined for said one of the plurality of virtual channel values contained in the received ATM cell;
   wherein the DSL modem transmits the output ATM cell to a DSL circuit connected to the router.

5. The DSL modem according to claim 3, wherein the VC management unit determines one of the plurality of virtual channel values related to the router, from a receiver IP address defined for the sender IP data of the input IP data.

6. A provider-site router that is connected to a user-site digital subscriber line DSL modem to provide mutual communications between the modem and the router by using an existing two-wire telephone line and an existing DSL communication technology, the router comprising:
   a VC management unit correlating a plurality of virtual channel values to a PPP connection between the modem and the router;
   an IP data priority unit receiving input IP data and outputting the IP data according to a priority class defined for a sender IP data contained in the input IP data; and
   an ATM cell generating unit generating an ATM cell in which one of the plurality of virtual channel values corresponding to the sender IP data of the input IP data is assigned to the output IP data.

7. A provider-site router that is connected to a user-site digital subscriber line DSL modem to provide mutual communications between the modem and the router by using an existing two-wire telephone line and an existing DSL communication technology, the router comprising:
   a VC management unit correlating a plurality of virtual channel values to a PPP connection between the modem and the router;
   an ATM cell generating unit generating an ATM cell by setting one of the plurality of virtual channel values corresponding to a sender IP data of an input IP data, to the input IP data;
   an ATM cell priority unit receiving the ATM cell and outputting the ATM cell according to a priority class defined for said one of the plurality of virtual channel values contained in the received ATM cell.

* * * * *